Figure 1:
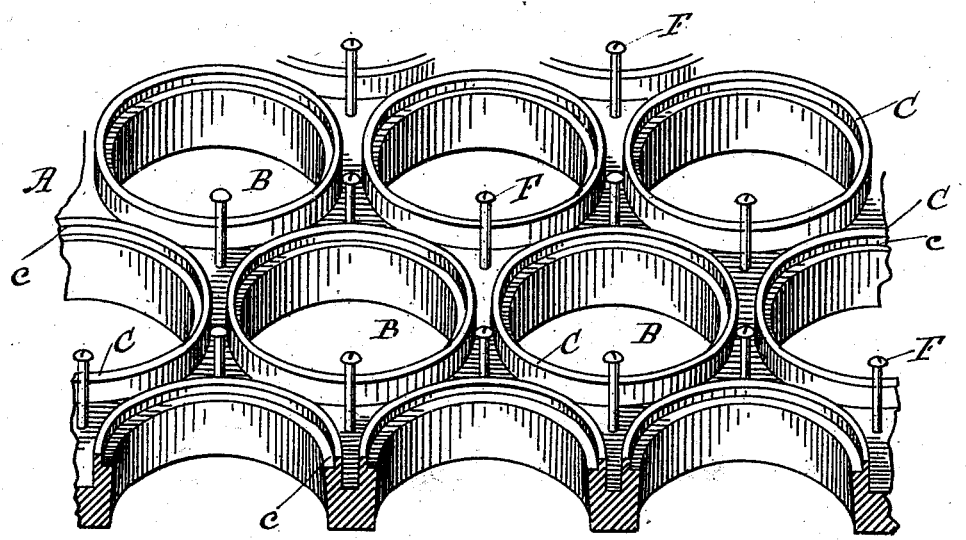

(No Model.) 4 Sheets—Sheet 1.
H. HAUSTEIN.
ILLUMINATING TILE CONSTRUCTION.

No. 505,044. Patented Sept. 12, 1893.

Witnesses. Inventor.
H. Monteverde. Henry Haustein
A. A. Baxter by A. H. Ste Marie
atty

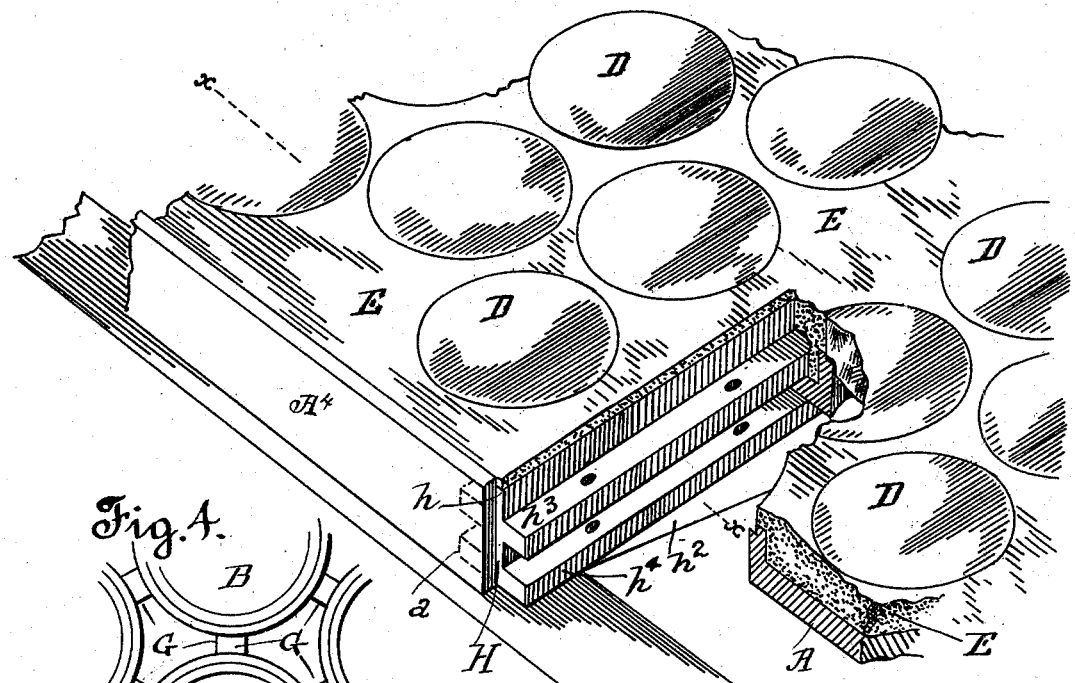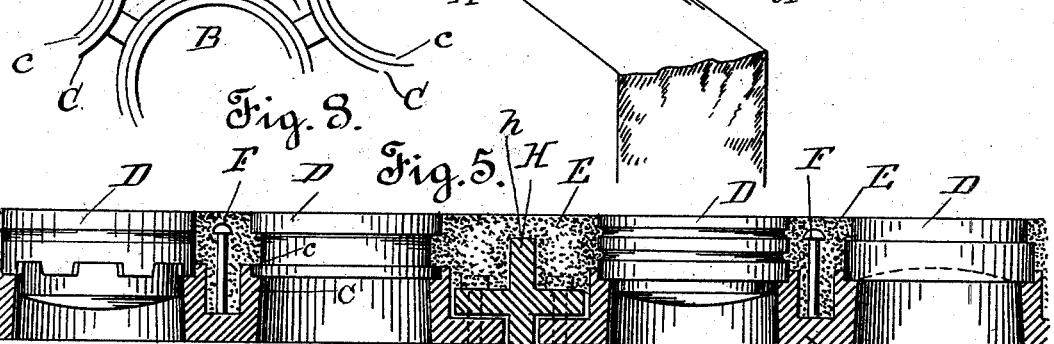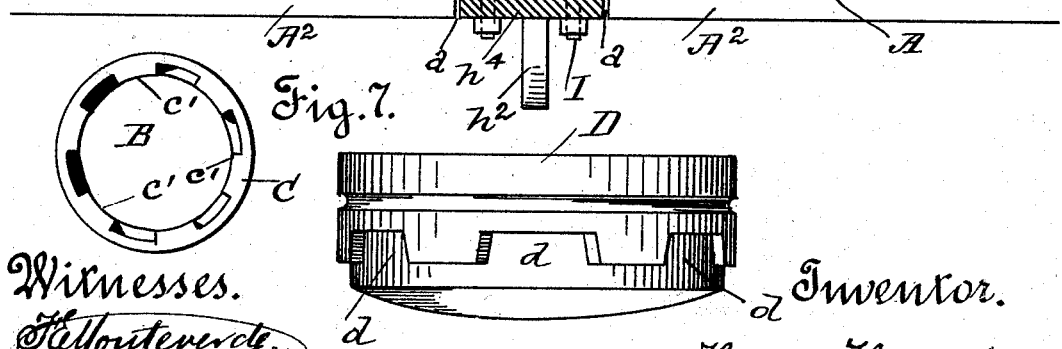

(No Model.) 4 Sheets—Sheet 3.
H. HAUSTEIN.
ILLUMINATING TILE CONSTRUCTION.

No. 505,044. Patented Sept. 12, 1893.

Witnesses.
H. Monteverde.
A. A. Baxter

Inventor.
Henry Haustein
by A. H. Ste Marie
att'y (No Model.) 4 Sheets—Sheet 4.

H. HAUSTEIN.
ILLUMINATING TILE CONSTRUCTION.

No. 505,044. Patented Sept. 12, 1893.

Witnesses.
F. Monteverde
A. A. Baxter

Inventor.
Henry Haustein
by A. H. Ste Marie
att'y

UNITED STATES PATENT OFFICE.

HENRY HAUSTEIN, OF SAN FRANCISCO, CALIFORNIA.

ILLUMINATING-TILE CONSTRUCTION.

SPECIFICATION forming part of Letters Patent No. 505,044, dated September 12, 1893.

Application filed March 23, 1893. Serial No. 467,383. (No model.)

*To all whom it may concern:*

Be it known that I, HENRY HAUSTEIN, a citizen of the United States, and a resident of the city and county of San Francisco, State of California, have invented certain new and useful Improvements in and Connected with the Construction of Illuminating-Tiles, of which the following is a full, clear, and exact description.

The object of my invention is to increase the strength and light-transmitting capacity of illuminating-tiles, which I accomplish by employing a mode of construction that enables me to make tiles of a large size and thereby do away partly or wholly with bearers, as also to largely reduce the number of joints found in other structures of same type and which involve the expenditure of much time and labor, are subject to leakage, and increase the cost of manufacture considerably.

My invention consists of a metallic plate provided with light-openings each of which is surrounded by an upwardly-projecting flange whose upper edge forms the seat of a lens and has in addition an annular rim or shoulder that keeps the lens from being shifted from side to side.

It further consists in providing the flanges that surround the light-openings in said metallic plate with lugs projecting upwardly within said rim and adapted to fit into corresponding recesses formed in the lower side of the lenses, thereby affording a better seat for said lenses and greater facilities for retaining them in place.

It further consists in the combination of the metallic plate with concrete or cement filling and screws cast in or fastened to the plate between the various light-openings, whereby the plate and concrete or cement are firmly bound together.

It further consists in providing the metallic plate with a downwardly-extending offset at each end, which runs within a short distance of its sides and raises them so that they may be slipped in between the flanges of the bearer usually connected therewith, thus bringing the supporting parts of the bearer in a line with the ends of the tile on its under side.

It consists, lastly, in forming adjacent tiles with indented or notched edges and light-openings of peculiar construction by means of which I am enabled to join tiles together without the use of bearers and thereby produce tile-work that is closely united and lighter than is possible to make otherwise.

Figure 2:
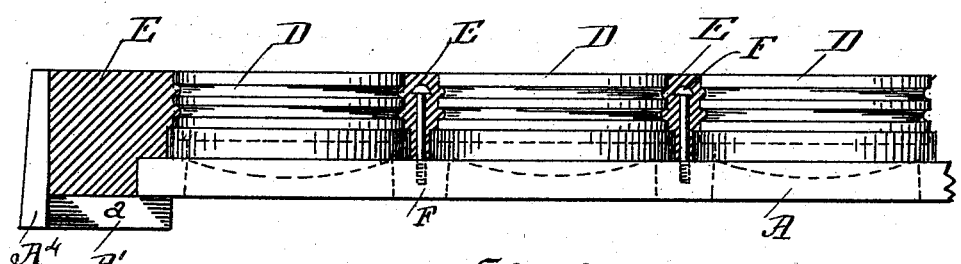
Figure 3:
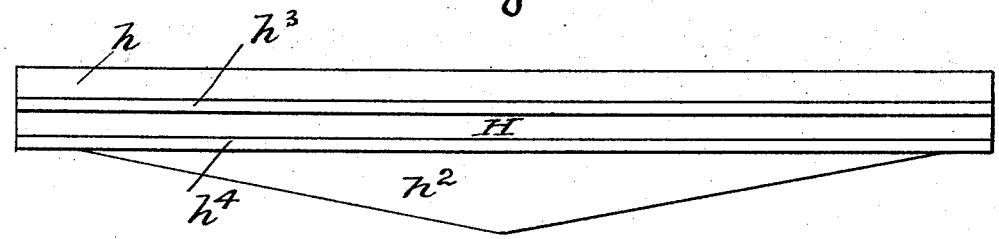
Figure 9:
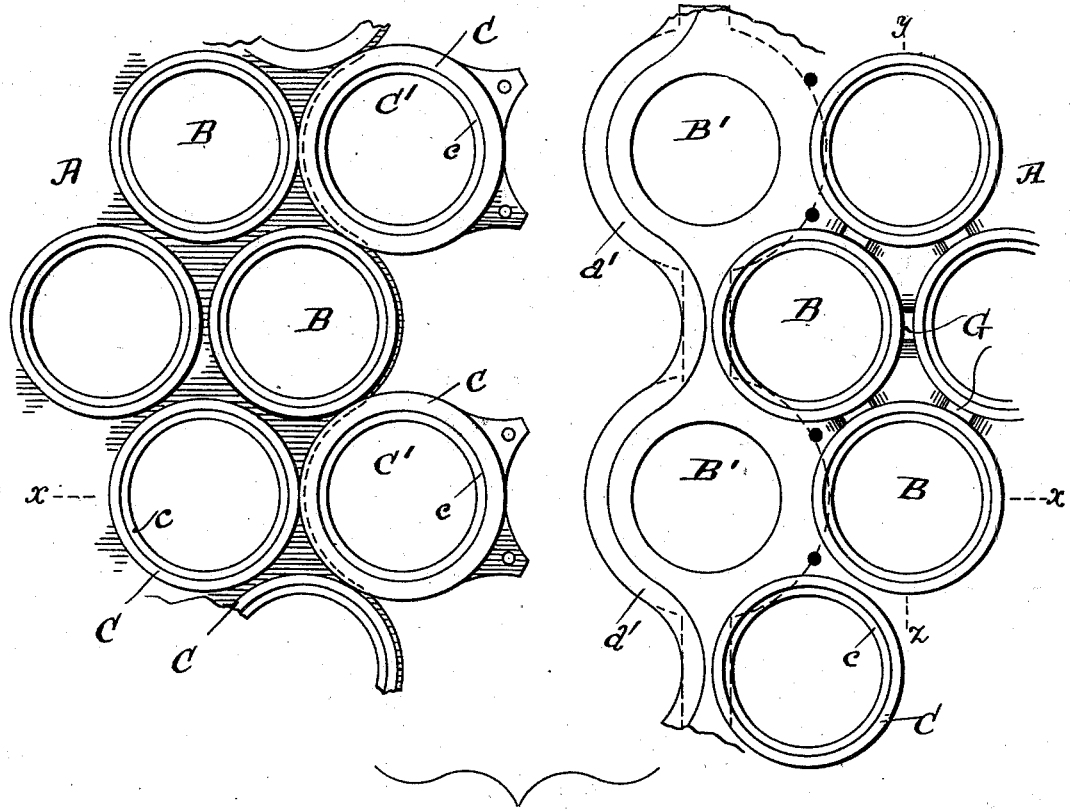
Figure 10:
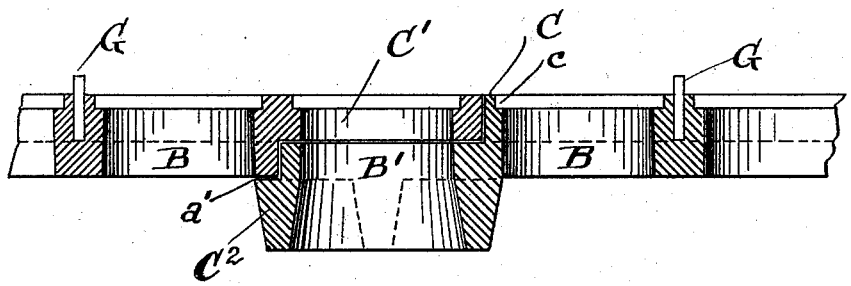
Figure 11:
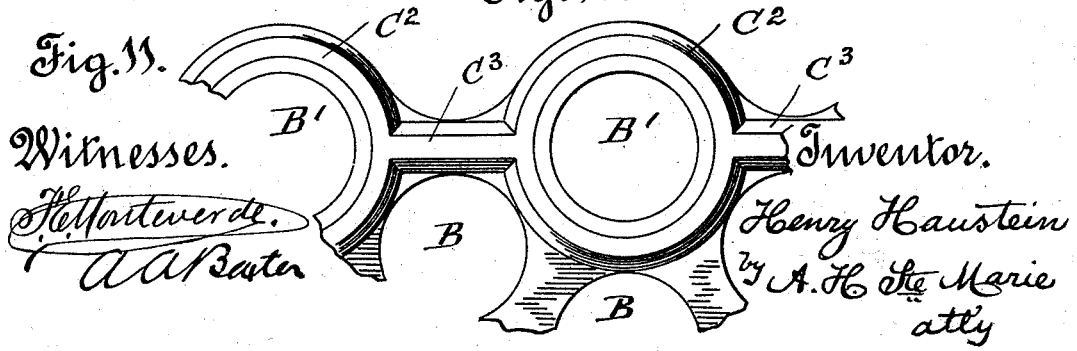
Figure 12:
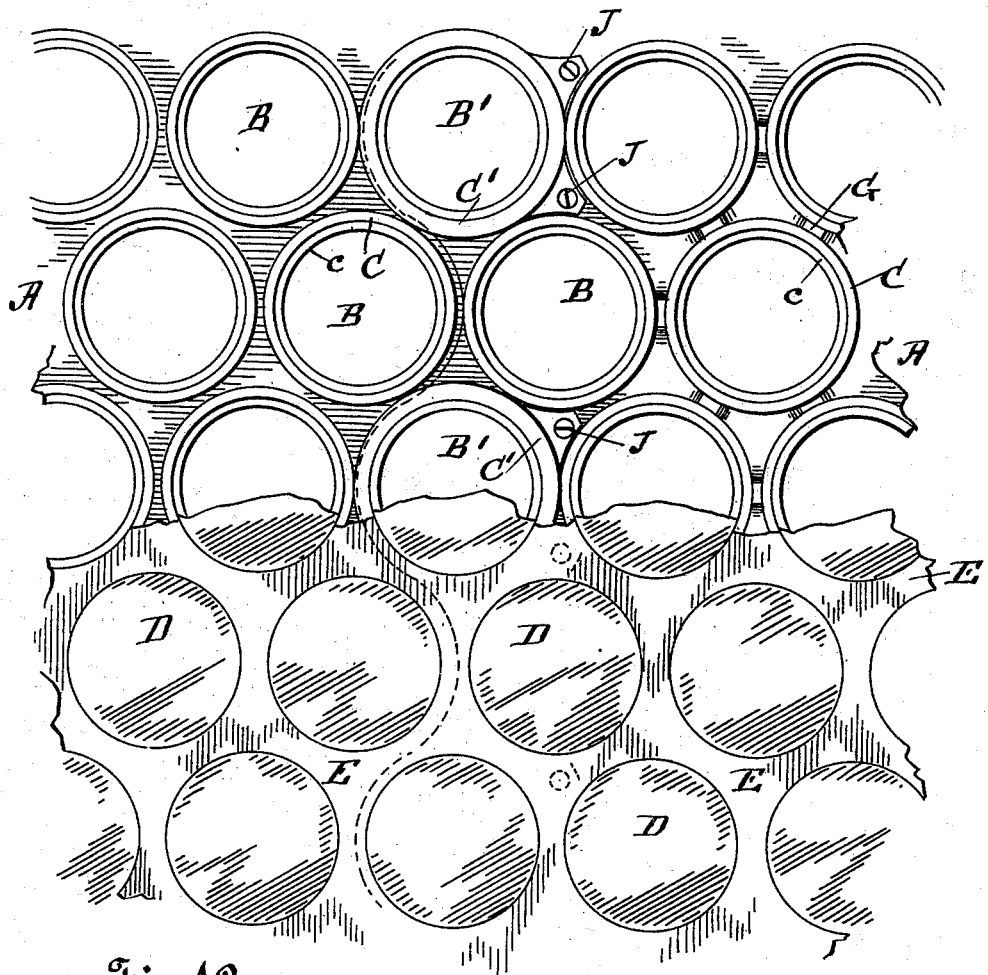
Figure 13:
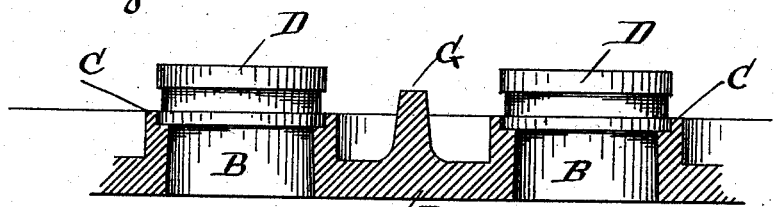
Figure 14:
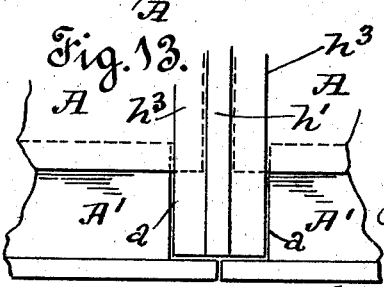

Referring to the accompanying drawings, in four sheets, which form part of this specification,—Figure 1 is a broken perspective view of a tile-frame pertaining to my construction, showing the improved seat for the lenses and the concrete-retaining screws between the light-openings. Fig. 2 is a side elevation of the same, showing lenses in the light-openings and some of the concrete filling. Fig. 3 is a side elevation of a bearer used for supporting the sides of adjacent tiles. Fig. 4 is a broken perspective view of two tiles joined together with a bearer of the type shown at Fig. 3. Fig. 5 is a vertical cross-section taken from the line $x\,x$, Fig. 4. Fig. 6 is an elevation of a new form of lens entering into the composition of my improved illuminating-tile. Fig. 7 is a plan of the annular flange wherein the tile shown at Fig. 6 is seated. Fig. 8 is a broken top view of the tile-plate, showing how the spaces between the various light-openings may be partly filled in so as to facilitate the work of casting, strengthen the plate, and provide at times a substitute for the screws shown in the other figures. Fig. 9 is a broken plan, in two parts, of adjoining tiles the sides of which are so shaped that they can be united without the use of bearers. Fig. 10 is a vertical section on the line $x\,x$, Fig. 9, showing how the tiles illustrated therein appear when united. Fig. 11 is a bottom view of the light-openings formed by the meeting edges of the tiles represented at Figs. 9 and 10. Fig. 12 is a top view of the construction represented in the latter-named figures, with part of the lenses and concrete filling set in. Fig. 13 is a vertical section on the line $y\,z$, Fig. 9. Fig. 14 is a plan taken from the lower part of the two adjoining tiles, showing the offsets in the plates.

Like letters of reference are used to indicate like parts throughout the different views.

Let A represent a metallic plate, which is preferably cast in one piece and provided with adjacent rows of light-openings B.

Around each of these openings and cast integral with the plate is an upwardly-projecting flange C, the upper part of which is inwardly rabbeted at $c$ and therefore affords a suitable seat and inclosing border or annular shoulder for the various forms of lenses D with which it may be desired to fill or cover the light-openings, the inner upper edge of each flange acting as a support for the lenses and the outer upper edge thereof as a surrounding rim, so that the lenses may be firmly seated and not be shifted from side to side, whatever may be their shape. As just stated, the lenses D may be of any desired form, as my improved construction admits of free choice in this respect. Still I prefer using the form of lens illustrated at Fig. 6, as being one that will give more general satisfaction. This lens, as will be seen by reference to said figure, has recesses $d$ in its lower part that afford a firm hold for corresponding lugs $c'$ which I provide within the flanges C. Such lenses being once seated, they cannot be shifted sidewise nor can they even be turned round, the result being a better finished tile and greater ease in handling it.

E represents the concrete or cement filling which I use to fill the interstices between the flanges that surround the lenses on the plate and to cover the tile-work. To secure a closer adhesion of this filling to the structure I provide the tile-plates with screws F, which may be fastened thereto in any suitable manner but are preferably cast therewith. These screws become embedded in the cement or concrete when it is applied and acquire such a grip thereon after it is set that it cannot be loosened by ordinary wear.

Besides the screws F, or sometimes to take the place thereof, I provide the tile-plates with ligaments or upwardly-projecting studs G, such as are shown in Figs. 9, 10, 12, and 13, between the various flanges surrounding the light-openings. By preference, these ligaments or studs are slightly curved on both sides and made to project above said flanges, coming up a little below the upper part of the lenses. They serve to retain the filling in place, and moreover strengthen the plates, the casting of which is also facilitated by them.

Adjoining tiles may be united by means of a bearer H, represented at Figs. 3, 4, 5, and 14. This bearer is of an I-beam shape and has top and bottom ribs $h'$ $h^2$ projecting at right angles, respectively from the upper and lower parallel flanges $h^3$ $h^4$ that project laterally from the body of the bearer. The rib $h'$ above the flanges extends the full length of the bearer and is made low enough to admit of its being completely covered with concrete or cement when the lenses are in place and the tiles brought together. The rib $h^2$ below the flanges may be of any suitable length so long as it does not interfere with the underlying cross-beams or walls of the buildings where the tiles are laid. These ribs greatly strengthen the bearer and the tile-work generally, so that the tiles may be made to span larger spaces than usual. In putting the tiles together, the sides of each plate are brought in between the parallel flanges of the bearer and rigidly secured thereto by screws or bolts I. Filling material is then poured over, or otherwise applied, and the joints fully covered, as also the whole structure, nothing but the lenses and the cement or concrete being seen at the top, thereby producing an even walking surface.

In the present way of laying illuminating tiles with bearers, those parts of the bearers that rest on the end supports are made to project below the tile-plates, and the brickwork, or bearing-beam, or whatever supports them, has to be recessed to receive the same, which involves a good deal of work and expense. I avoid this in my improved construction by providing the ends of each plate with downwardly-extending offsets A' A² that are adapted to bear upon the stone coping, or the brick-work, or any other kind of support, and bring the plates in proper position for connection with the bearers by raising them so that their sides will reach up midway between the flanges $h^3$ $h^4$. The plates are then on a level with the middle part of the bearers, and the offsets and lower flanges $h^4$ also in line with each other. Constructed and combined as described, the tiles may be laid on any plain straight surface without forming recesses for the ends of the bearers. The offsets are preferably cut away at $a$ to allow the ends of the bearers to reach out closer to the outer flanges A⁴ at the ends of the plates.

Figs. 9 to 13 show tiles so made that they can be joined without having recourse to bearers, thereby avoiding the blank spaces resulting from the use of such devices. The meeting edges of these tiles are indented or notched, forming when united a wavy line that runs by the side of light-openings that are common to each tile. One of the plates is provided at the points of juncture with outwardly-projecting light-openings B' that are similar to the openings B but devoid of flanges, whereas the other plate is cut into at corresponding places and at such places has laterally-projecting rings or light-openings C' that are the equivalents of the flanges C, except they are of increased thickness. By bringing the two plates together the rings C' completely overlap the openings B', and as a result there is produced a central row of holes that belong to both plates and may be utilized for the insertion of lenses as in the other parts of the tiles. The tile-plates having been joined, they may be secured to each other by screws J and the joint then covered with cement or concrete, thus making the structure appear as consisting of a single tile, notwithstanding its length. This construction is very suitable for vault-lights or other similar coverings that are not subjected to heavy strain or pressure, but to render it still more solid I provide the under side of the plate which is devoid of upper flanges around its marginal openings with reinforcing flanges $C^2$, such as are shown in Figs. 9 and 10, and connect the same with strengthening ribs $C^3$. The tile-work is thereby made stronger and will stand rougher usage. For the same purpose, the meeting edges of the plates may be rabbeted as at $a'$ and lapped, if desired.

Having described my invention, what I claim and desire to secure by Letters Patent of the United States, is—

1. A tile-plate having light-openings surrounded by an upwardly-projecting flange upon the upper inner edge of which lenses of various shapes may be squarely seated, the upper outer edge of the flange forming a raised border or annular shoulder inclosing the lenses, substantially as set forth.

2. An illuminating-tile comprising light-openings, inwardly-rabbeted flanges around said openings, lugs upwardly-projecting from the inner upper edges of said rabbeted flanges, and lenses having recesses corresponding to said lugs, substantially as set forth.

3. The combination, in an illuminating-tile, of a perforated plate, screws cast therein or otherwise secured thereto, and concrete or cement filling, substantially as set forth.

4. The combination, in an illuminating-tile, of a plate having light-openings, upwardly-projecting flanges surrounding each of these openings, and ligaments connecting and projecting above said flanges, substantially as set forth.

5. The combination, in an illuminating-tile, of a perforated plate, screws projecting therefrom, flanges around the openings in said plate, ligaments projecting above said flanges, and filling, substantially as set forth.

6. The herein-described illuminating-tile construction comprising plates having light-openings, lenses in said openings, a bearer having parallel flanges between which the sides of said plates may be inserted and top and bottom ribs at right angles thereto, the said top rib lying below the top surface of said lenses, and cement or concrete filling wholly covering the upper side of said bearer and plates between and around the lenses whereby an even walking surface is produced, substantially as set forth.

7. The herein-described illuminating-tile construction comprising a bearer having parallel flanges and plates provided with downwardly-extending offsets at each end whereby the sides of said plates are raised so that they may be inserted between said flanges and the ends thereof be in line with the supporting parts of said bearer on the under side, substantially as set forth.

8. The herein-described illuminating-tile construction comprising a tile-plate having whole light-openings projecting outwardly and entirely overlapping similar openings in an adjoining tile-plate, substantially as set forth.

9. The combination of a tile-plate having outwardly-projecting rings or light-openings, a corresponding plate having similar reinforced openings entirely lapped over by said rings, and strengthening ribs between said reinforced openings, substantially as set forth.

In testimony whereof I have hereunto set my hand and seal.

HENRY HAUSTEIN. [L. S.]

In presence of—
H. P. TRICOU,
A. H. STE. MARIE.